US006089647A

United States Patent [19]

[11] Patent Number: 6,089,647

Glanton et al.

[45] Date of Patent: Jul. 18, 2000

[54] SCHOOL BUS DOOR OPERATOR

[75] Inventors: Darrell D. Glanton, Bryant; Jack G. Barker, Conway; Mark A. Anderson, Greenbrier; Donnie J. Fowler, Damascus; Jerry W. Huie, Jerusalem; James R. Thomas, Bigelow; Mark A. Seymore, Conway, all of Ark.

[73] Assignee: Navistar International Transportation Corp., Chicago, Ill.

[21] Appl. No.: 09/397,171

[22] Filed: Sep. 16, 1999

Related U.S. Application Data

[60] Provisional application No. 60/101,065, Sep. 18, 1998.

[51] Int. Cl.[7] .......... B60J 1/08

[52] U.S. Cl. .......... 296/146.4; 296/29; 296/146.1

[58] Field of Search .......... 296/29, 146.4; 49/328, 329, 366, 109, 108, 103; 74/102, 104

[56] References Cited

U.S. PATENT DOCUMENTS

| | | | |
|---|---|---|---|
| 1,318,349 | 10/1919 | Boos . | |
| 1,660,377 | 2/1928 | Fitzjohn . | |
| 3,253,518 | 5/1966 | Duemler . | |
| 3,722,303 | 3/1973 | Rumph . | |
| 3,889,420 | 6/1975 | Hildebrand . | |
| 3,961,660 | 6/1976 | Vinci . | |
| 4,200,167 | 4/1980 | Cockman . | |
| 4,265,132 | 5/1981 | Robertson | 74/104 |
| 4,378,706 | 4/1983 | Miyamoto . | |
| 4,660,428 | 4/1987 | Payne . | |
| 4,901,589 | 2/1990 | Gaigl | 74/104 |

*Primary Examiner*—D. Glenn Dayoan
*Assistant Examiner*—Mickki D. Murray
*Attorney, Agent, or Firm*—Jeffrey P. Calfa; Dennis Kelly Sullivan

[57] ABSTRACT

An improved school bus door operator for a school bus, or other public transportation vehicle or bus. The improved school bus door operator of this invention consists of a linear actuated school bus door operator with a handle for operation by the driver and the linkage tying the operator to the school bus door. The linear actuated school bus door operator allows the driver of the school bus to open and close the school bus door with a back and forth short-stroke linear movement of the handle. This should reduce repetitive stress injuries which school bus drivers have occasioned. The improved school bus door operator generally consists of a handle slide mechanism, a rotatable pivot arm, and a door linkage arm engaged to the school bus door. The handle slide mechanism further consists of a slide arm that may be moved linearly within the handle slide mechanism. The slide arm has a handle that juts out generally in a vertical direction at a rearward portion of the slide arm. At an opposite end of the slide arm from where the handle is engaged is an engagement pawl. The engagement bolt also rises from the slide arm in a generally vertical direction. The rotatable pivot arm has two guide rails or a through-slot. The engagement bolt of the slide arm fits between the guide rails or through-slot of the rotatable pivot arm. The rotatable pivot arm has a pivot bolt, which allows the pivot arm to rotate on the dash or other mounting surface in the school bus.

33 Claims, 19 Drawing Sheets

VIEW B-B

SCHOOL BUS DOOR OPERATOR

This is a non-provisional application claiming priority under provisional patent application Ser. No. 60/101,065, filed Sep. 18, 1998.

BACKGROUND OF THE INVENTION

This invention relates to an improved school bus door operator for a school bus, or other public transportation vehicle or bus. The improved school bus door operator of this invention consists of a linear arm movement actuated school bus door operator with a handle for operation by the driver and the linkage tying the operator to the school bus door. The linear actuated school bus door operator allows the driver of the school bus to open and close the school bus door with a back and forth short-stroke linear movement of the handle. This should reduce repetitive stress injuries which school bus drivers have occasioned.

PRIOR ART

In recent years, there has been an increase in school bus driver injuries that may be attributed to the standard configuration of the manually operated school bus door operator. The prior art school bus door operator required the driver to grasp a handle and move the handle in a crank-like motion rotating the handle in a semi-circular movement in order to open or close the school bus door. The standard movement of the crank handle of the prior art required the driver to lean forward and reach out to grasp the operator and then rotate a lever using the handle in a semicircular fashion in order to actuate the door. Prior art school bus door operating apparatus of this type are shown in U.S. Pat. Nos. 3,722,303; 3,889,420; 3,961,660; and 4,200,167.

To date, a school bus door operator has not been suggested which allows the driver to maintain good posture in the driver seat while manually opening and closing the school bus door with a short-stroke back or forth linear motion of an operating mechanism handle.

SUMMARY OF INVENTION

As a result, a primary object of this invention is to provide an improved school bus door operator that allows the driver to maintain good posture in the driver seat while opening and closing the school bus door with a short-stroke back or forth linear motion of a door handle. A second object of the invention is to provide a school bus door operator that will not interfere with the school bus driving controls. A third object of the invention is to provide an improved school bus door operator that has its greatest torque or moment arm where needed. The most energy in school bus door operation is required at the end of the stroke where the door is approaching fully open, leaving the fully open, approaching fully closed or leaving the fully closed position. A fourth object of the invention is to provide an improved school bus door operator that may be fitted with a screw type linear actuating motor on an air operated piston.

The improved school bus door operator of this invention satisfies all of the above objects plus others not mentioned. The improved school bus door operator generally consists of a handle slide mechanism, a rotatable pivot arm, and a door linkage arm engaged to the school bus door. The handle slide mechanism further consists of a slide arm that may be moved linearly within the handle slide mechanism. The slide arm has a handle that juts out generally in a vertical direction at a rearward portion of the slide arm. There is an engagement bolt or pawl on the slide arm. In one embodiment, the engagement bolt is at the opposite end of the slide arm from where the handle is engaged. In the preferred embodiment, the engagement bolt is at a mid-position along the slide arm. The engagement bolt also juts out from the slide arm in a generally vertical direction. The rotatable pivot arm in one embodiment has two guide rails. The engagement bolt of the slide arm fits between the guide rails of the rotatable pivot arm. In the preferred embodiment, the guide rails are replaced by a through-slot in the rotatable pivot arm in which the engagement bolt of the slide arm rides within. The rotatable pivot arm has a pivot bolt or pin, which allows the pivot arm to rotate on the dash or other mounting surface in the school bus. When the handle of the slide arm is moved in a linear direction in the handle slide mechanism, the engagement bolt moves freely between and parallel to the guide rails or within the through-slot of the pivot arm depending on the embodiment. This movement of the engagement bolt causes the guide rails or through-slot and hence the rotatable pivot arm to rotate in a semi-circular radial fashion. The rotatable pivot arm pivots about or on the pivot bolt or pin. The door linkage arm is engaged to an end or corner of the rotatable pivot arm opposite the side of the guide rails. Where the rotatable pivot arm is generally triangular, the linkage arm will be engaged to a corner as will the guide rails or through-slot. As the rotatable pivot arm rotates on or about the pivot bolt, the door linkage arm is moved to either open or close the school bus door in a similar fashion as in the prior art. The movement of the engagement bolt or pin between the guide rails or through-slot varies the moment arm or mechanical advantage the driver has in opening or closing the door. The longer the moment arm the more torque the driver generates with the same force input to the handle. At the farthest forward and rearward points of the stroke of the slide arm, the moment arm comprised of the distance from the engagement bolt along the guide rails or through-slot to the pivot bolt of the rotatable pivot arm is at relative maximums and hence relative maximum torque values. The mounting location of the handle slide mechanism and the pivot bolt of the rotatable pivot arm is arranged for ease of operation by an average driver, whether they be male or female. The driver may sit with good posture in the driver seat, grasp the handle and move the slide in a linear fashion back or forth along the handle slide mechanism. This in turn causes the rotatable pivot arm to pivot and hence cause the school bus door to either open or close. A screw type motor for driving the slide arm in a linear fashion back and forth along the slide mechanism may be installed to remove the requirement for manual movement by the driver.

In another embodiment of the invention the rotatable pivot arm is mounted to a dash mount that has a semicircular arc slot cut in its face. The end of the rotatable pivot arm opposite the end with guide rails or engagement pawl directive means has a double bend zigzag arm which rides in the semicircular arc slot in the face of the dash mount. The inner ends of the semicircular arc slot act as over-travel limits for the rotatable pivot arm and the handle slide mechanism. In all embodiments, the handle slide mechanism may also contain a locking device that locks the handle in the door-closed position.

DRAWINGS

Other objects and advantages of the invention will become more apparent upon perusal of the detailed description thereof. In upon inspection of the drawings, in which.

Figure 1:
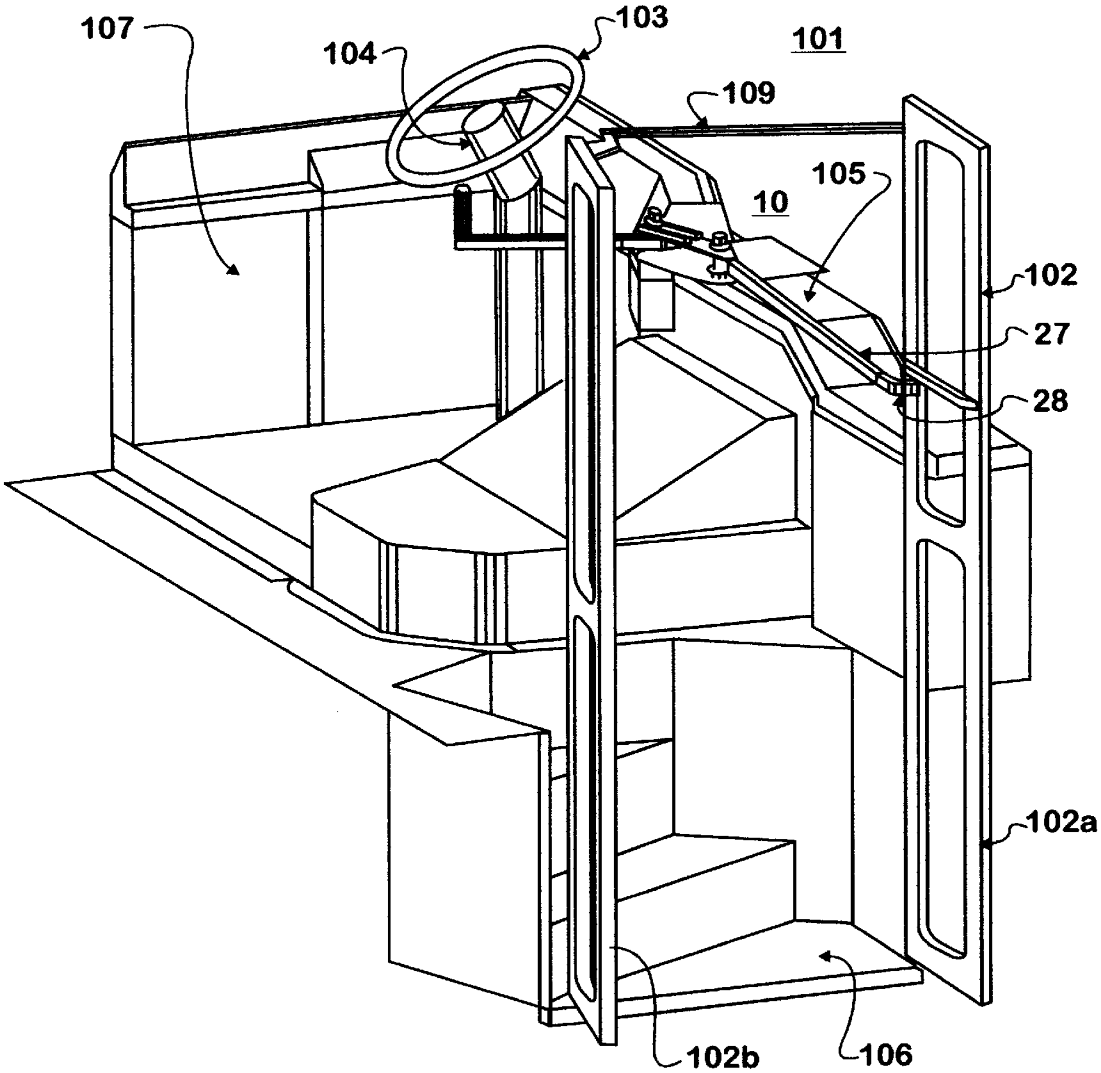
FIG. 1 is a partial cut away of a driver area of a school bus vehicle with an improved school bus door operator made in accordance with this invention, engaged to a school bus door which is open.
Figure 2:
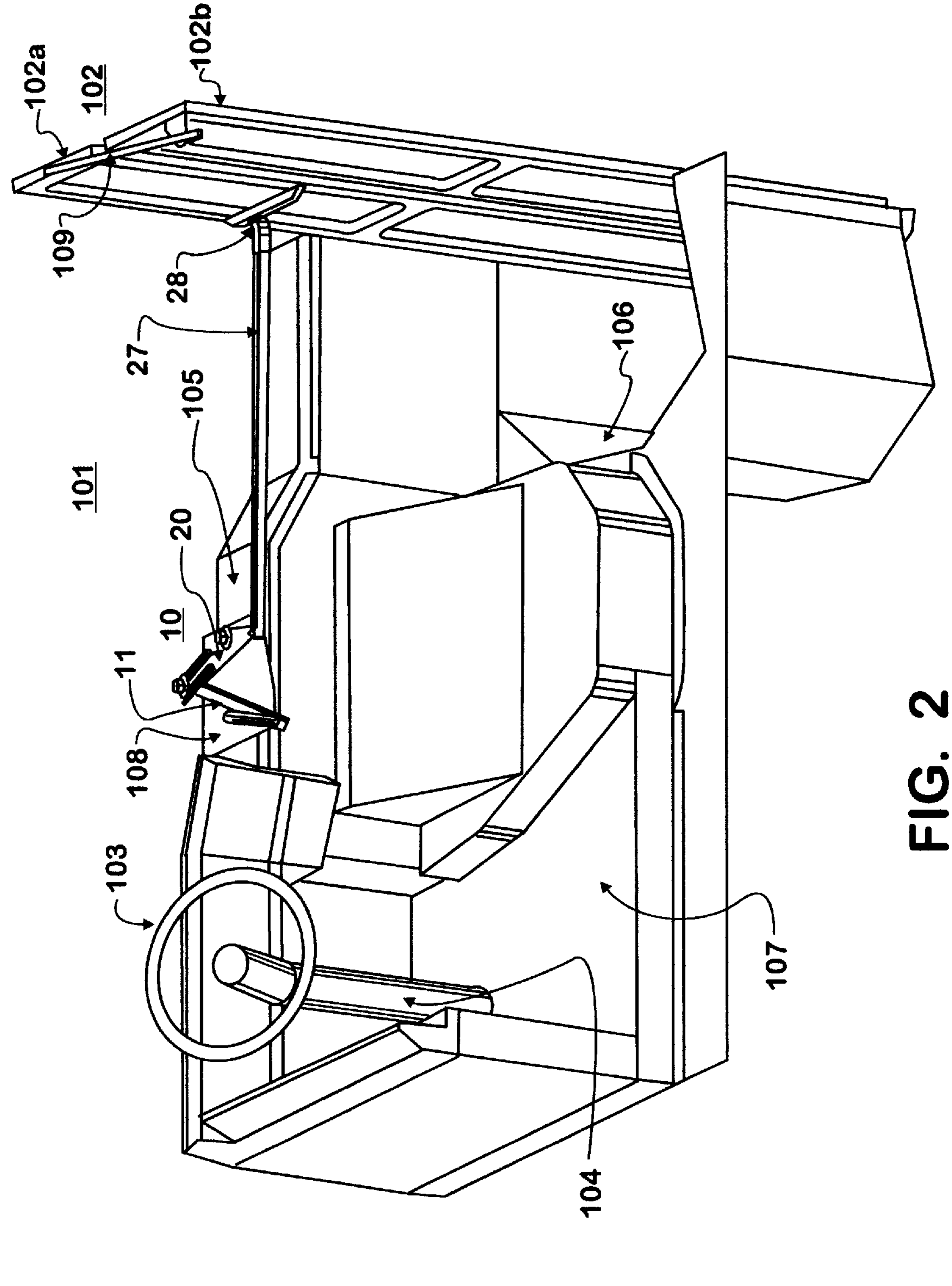
FIG. 2 is the school bus driver area of FIG. 1 shown with the school bus door closed.
Figure 3:
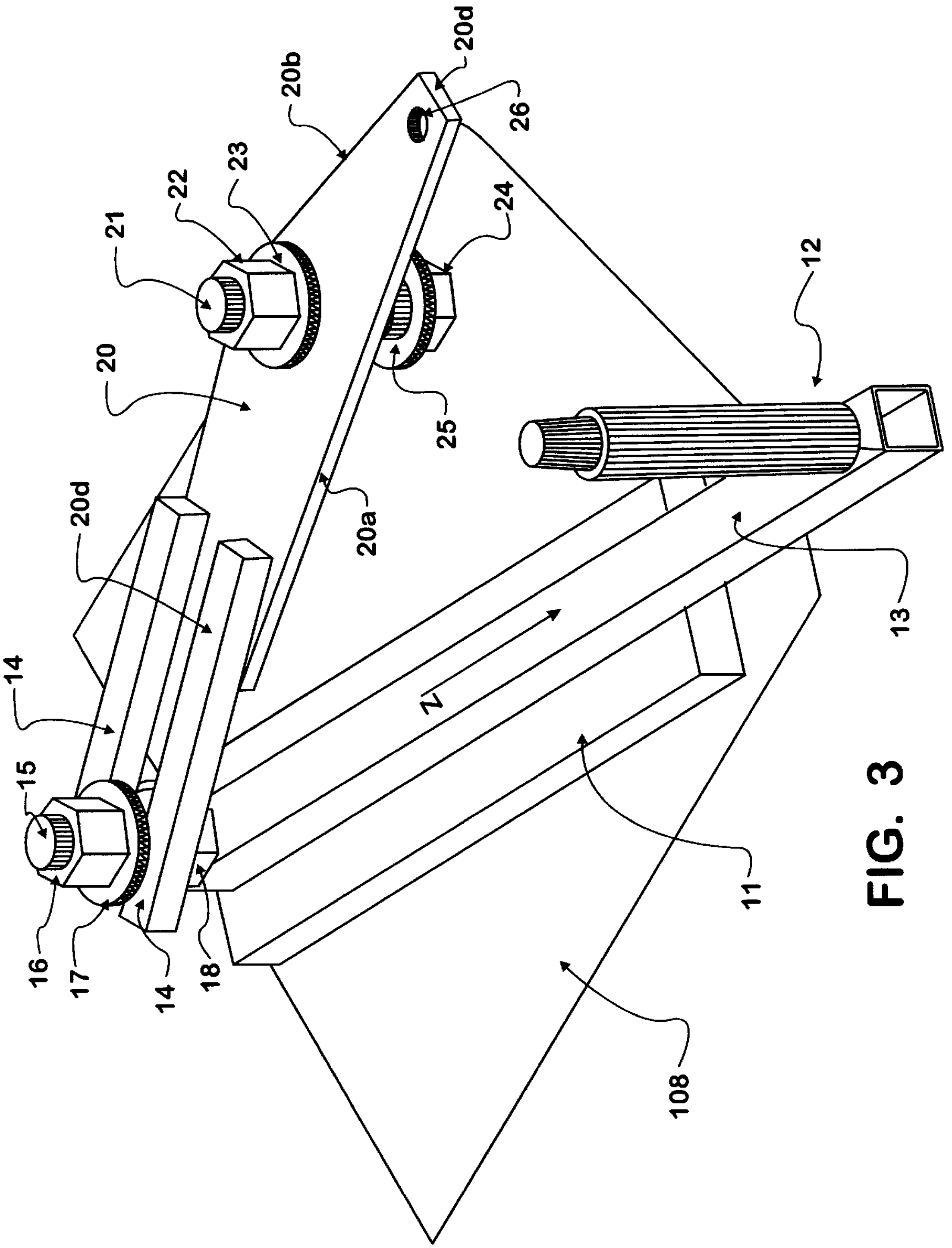
FIG. 3 is an improved school bus door operator shown disengaged from the door linkage of the school bus made in accordance with this invention.
Figure 4:
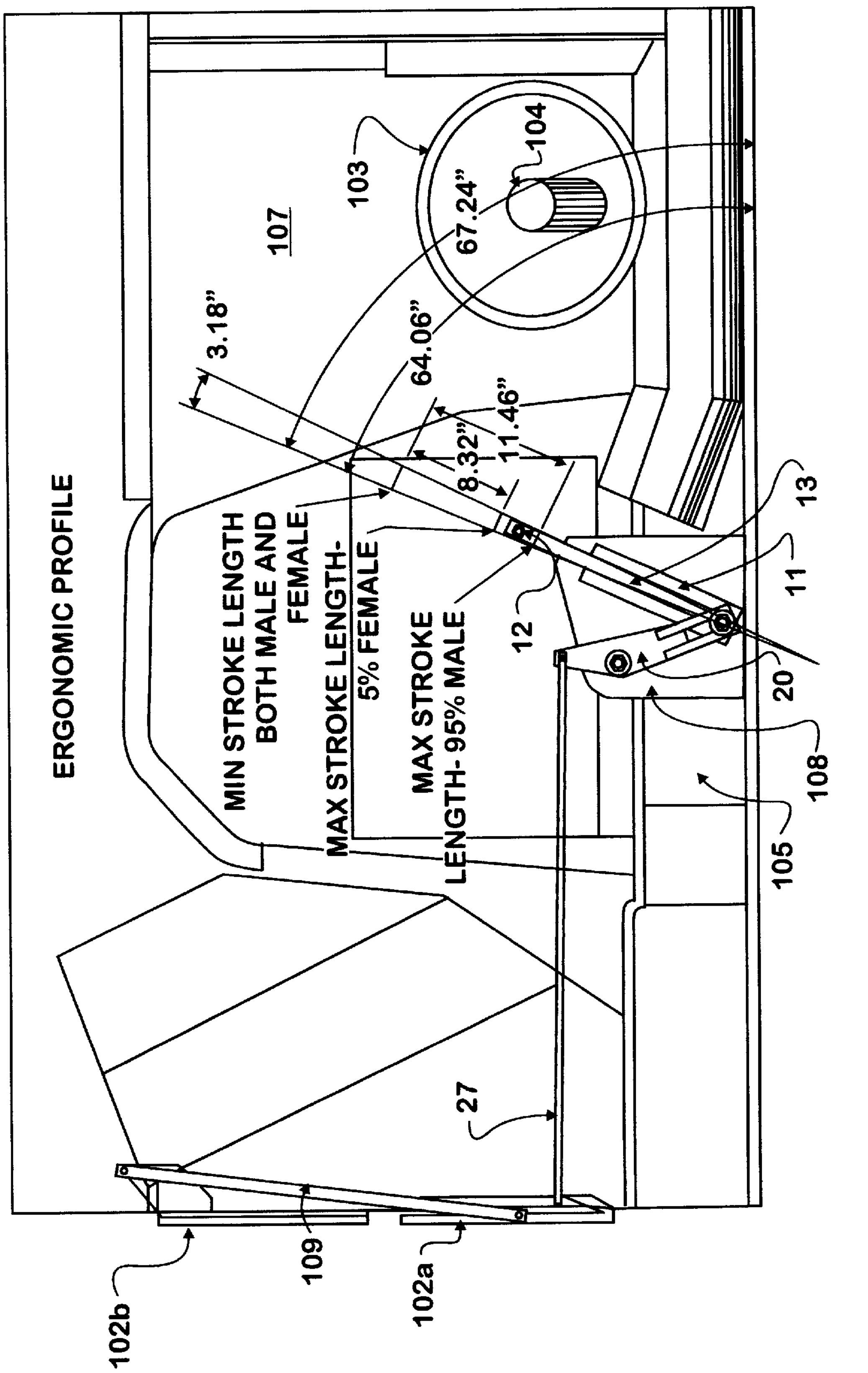
FIG. 4 is the top down view of a school bus driver area showing the ergonomic profile.
Figure 9A:
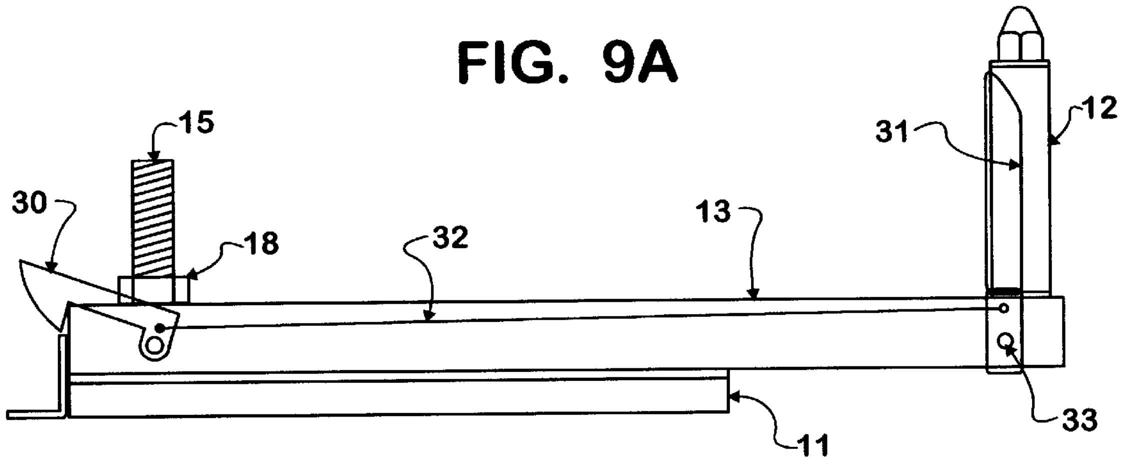

FIG. 9*a* is a sideview of the handle slide mechanism of the improved school bus door operator of FIG. 3, with a locking actuator disengaged.

Figure 9C:
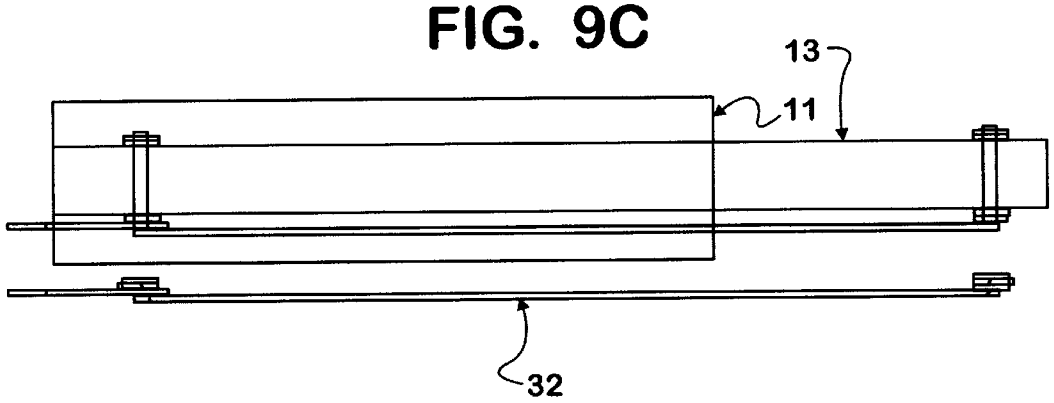
Figure 9B:
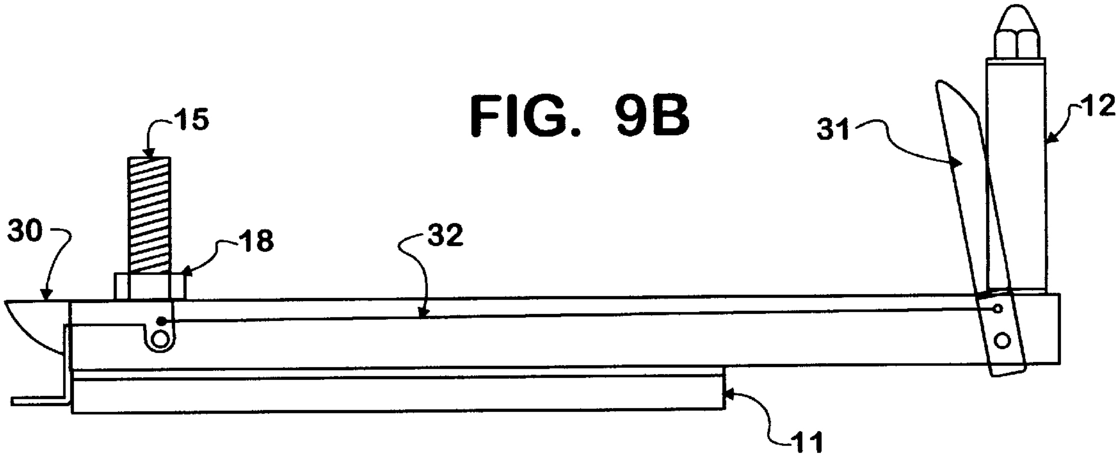

FIG. 9*b* is a sideview of the handle slide mechanism of FIG. 9*a* with the locking actuator engaged.

FIG. 9*c* is a bottom view of the handle slide mechanism of FIG. 9*a*.

Figure 10:
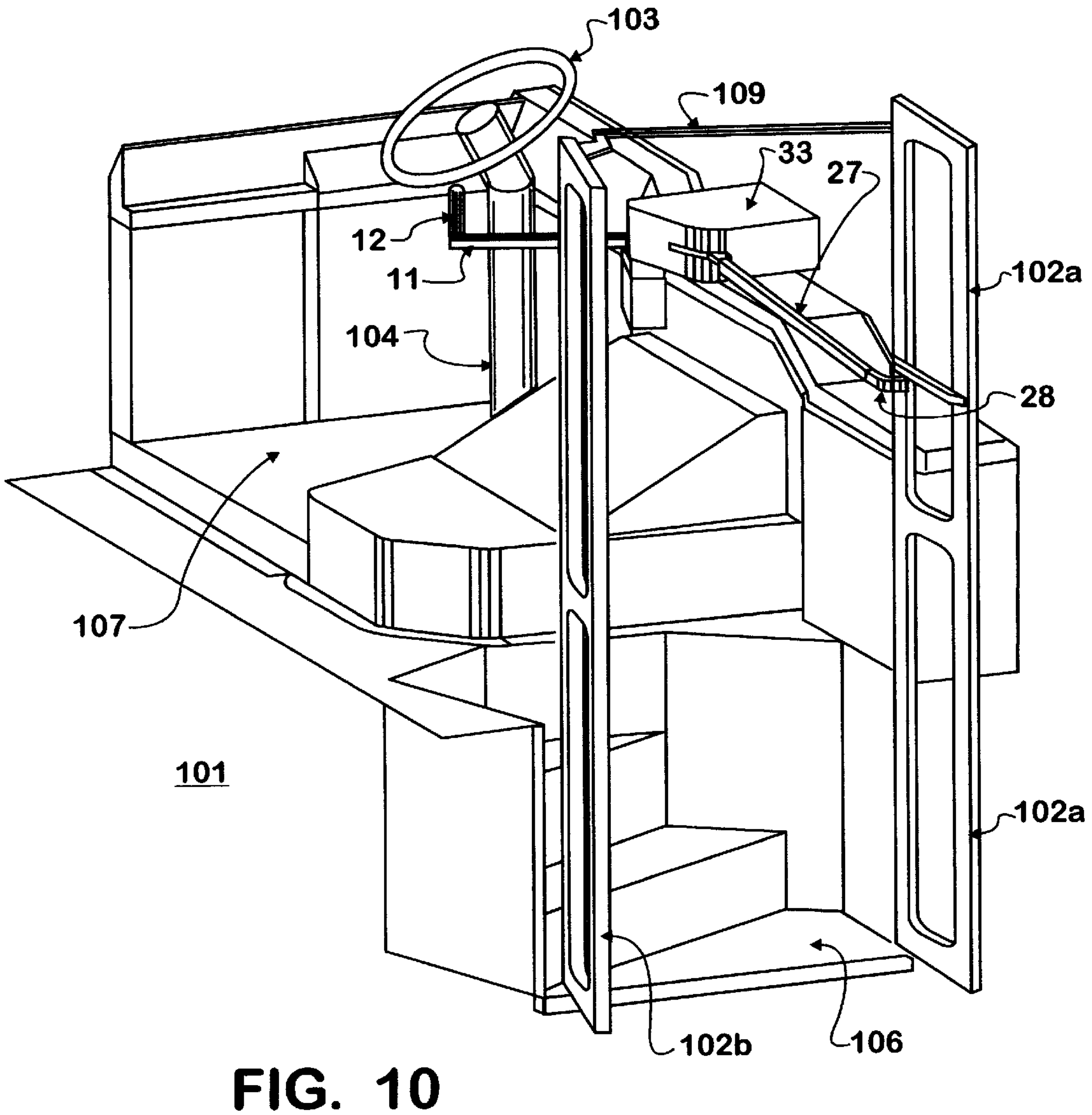

FIG. 10 is a partial cut away drawing of a school bus driver area with an improved school bus door operator with a protective cover installed which may house a motor made in accordance with this invention shown with the school bus door open.

Figure 11:
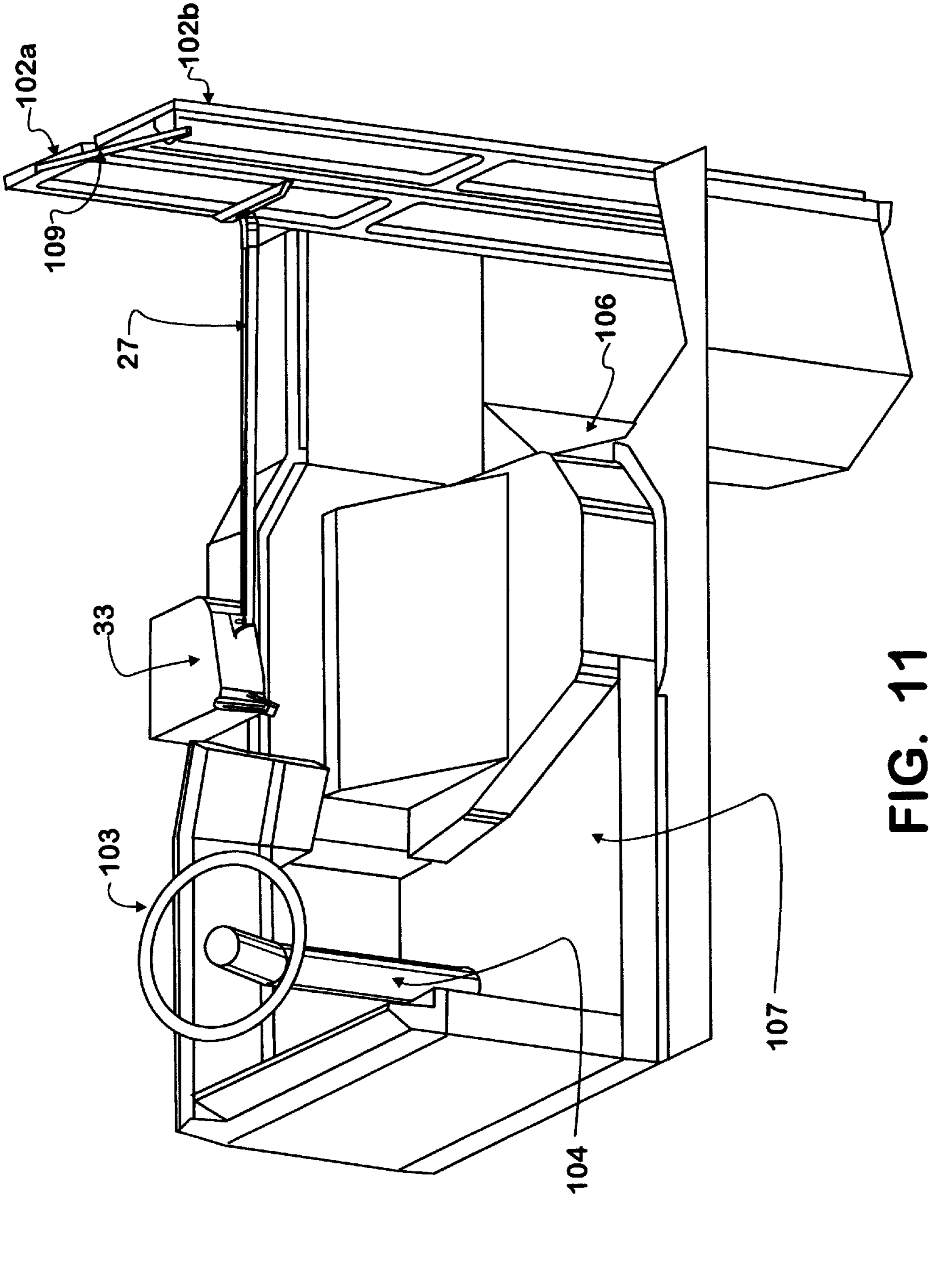

FIG. 11 is a rear looking forward prospective view of the school bus driver area of FIG. 10 with the school bus door closed.

Figure 12:
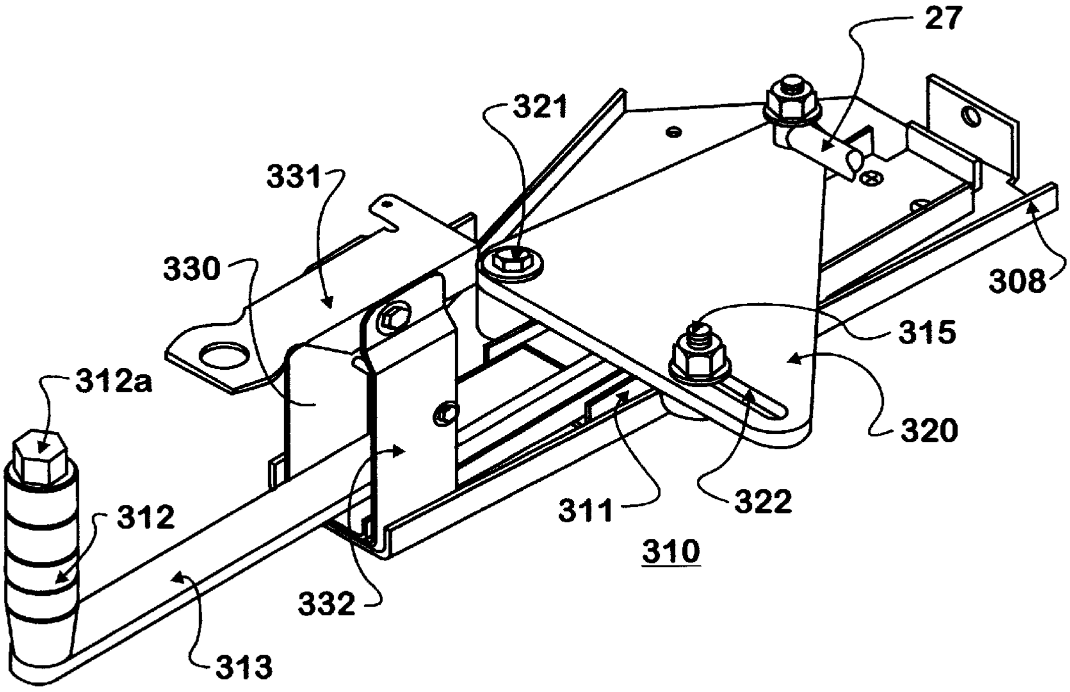

FIG. 12 is a perspective view of the preferred embodiment of an improved school bus door operator made in accordance with this invention.

Figure 13:
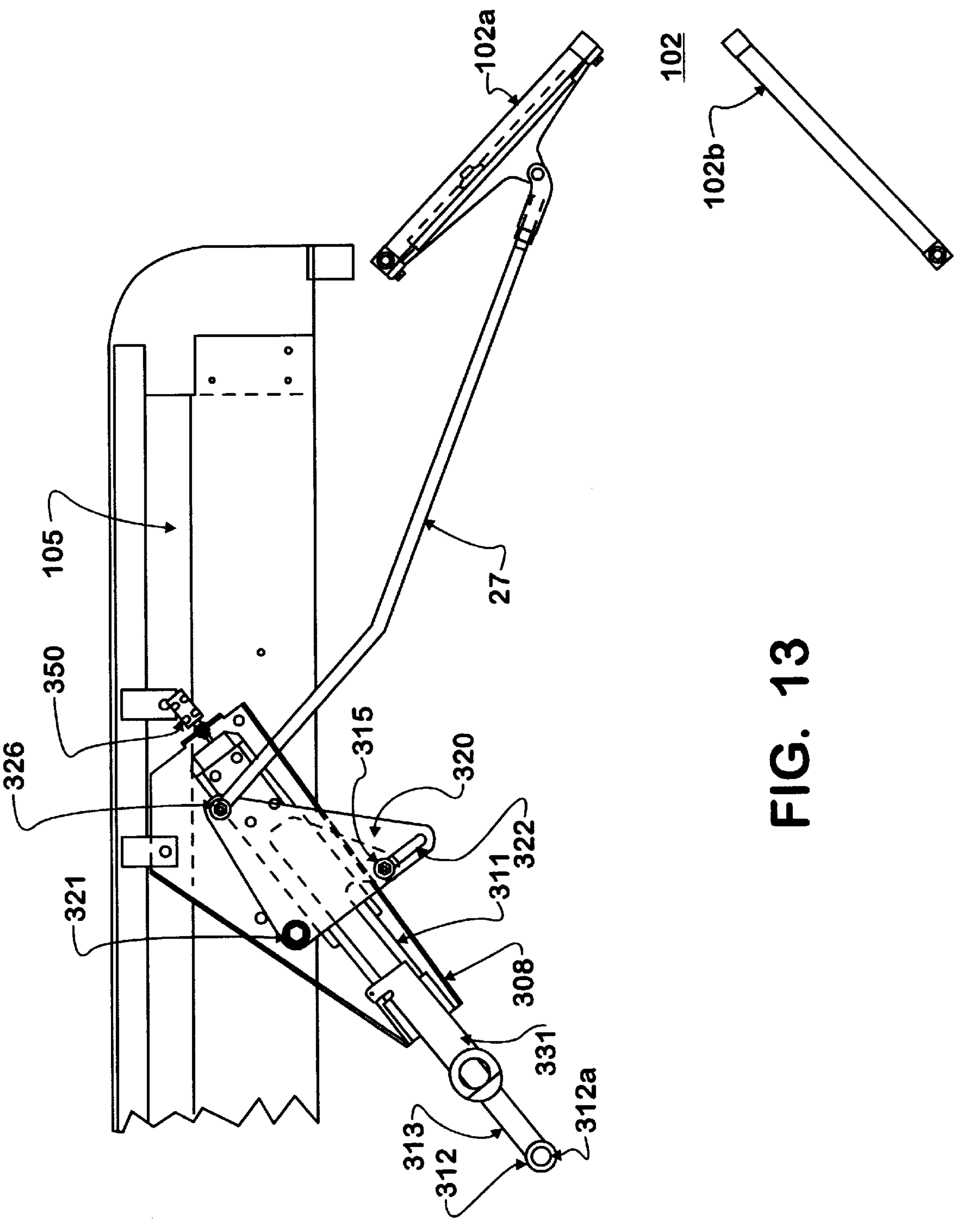

FIG. 13 is a top down view of the door operator of FIG. 12 installed on a push to open double flap door shown installed in a partial view of the a school bus driver area and with the door open.

Figure 14:
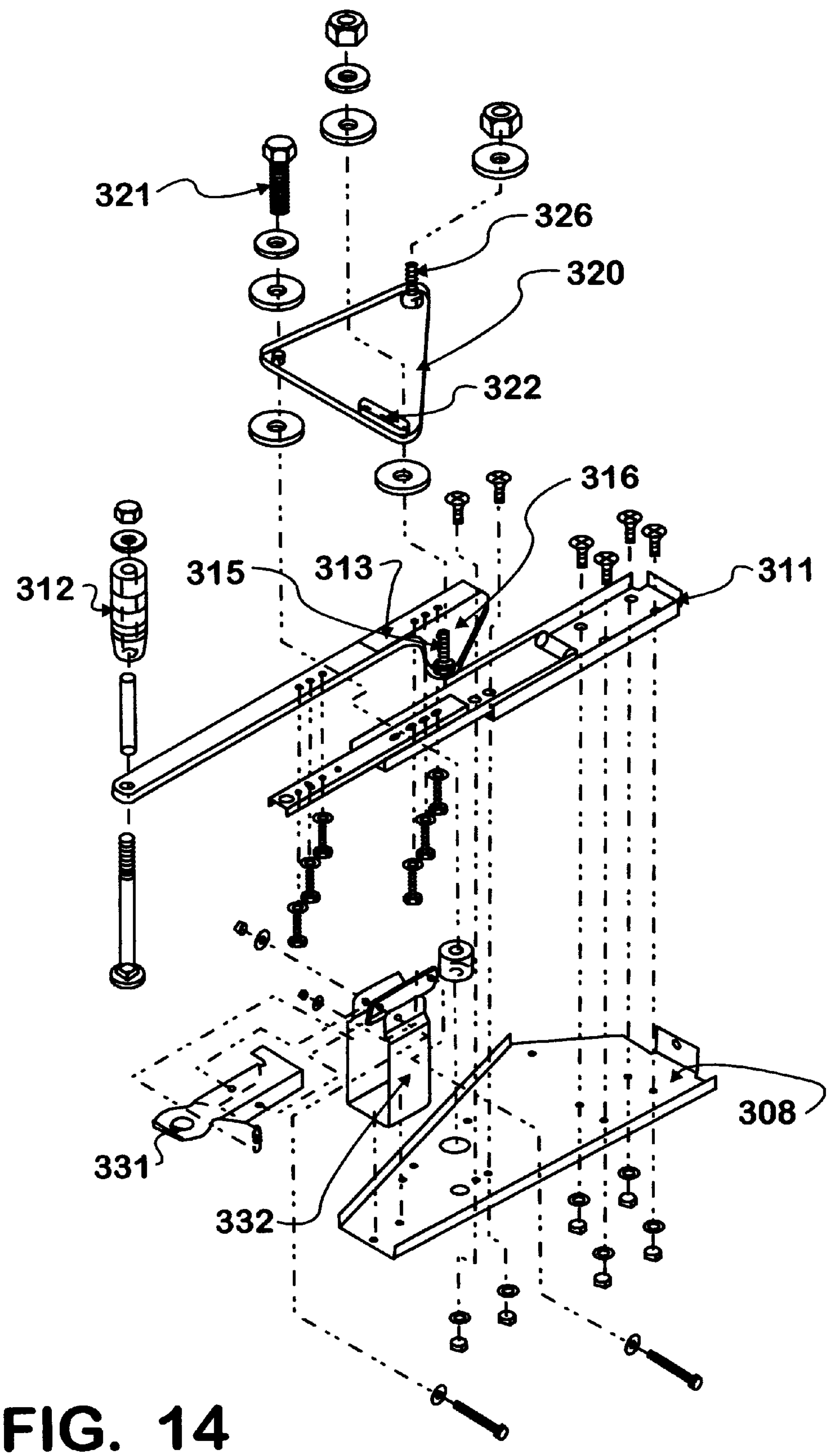

FIG. 14 is an exploded perspective view of the improved school bus door shown in FIG. 12.

Figure 15:
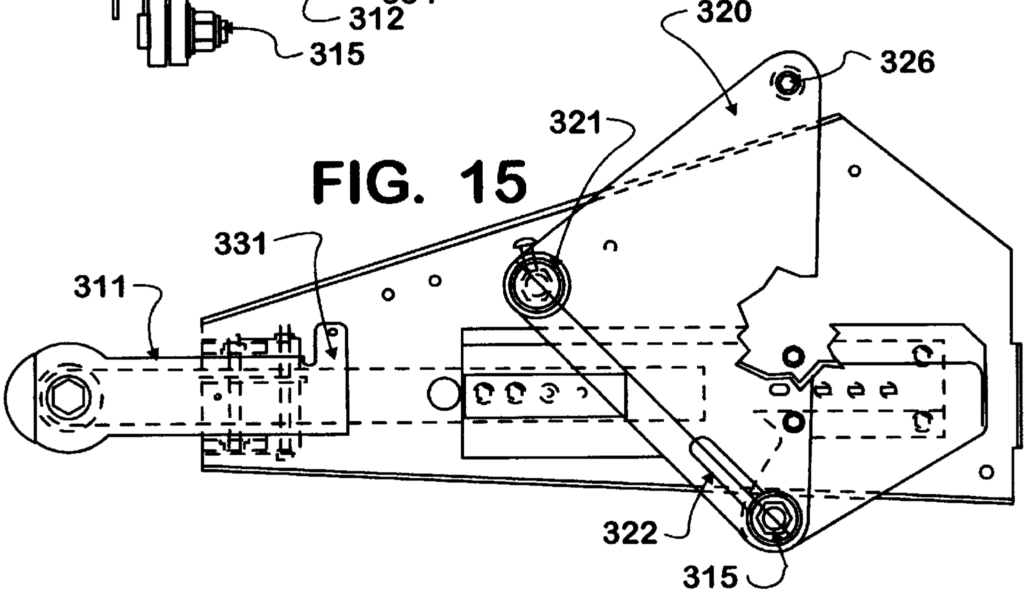

FIG. 15 is a top down view of the improved school bus door shown in FIG. 12.

Figure 16:
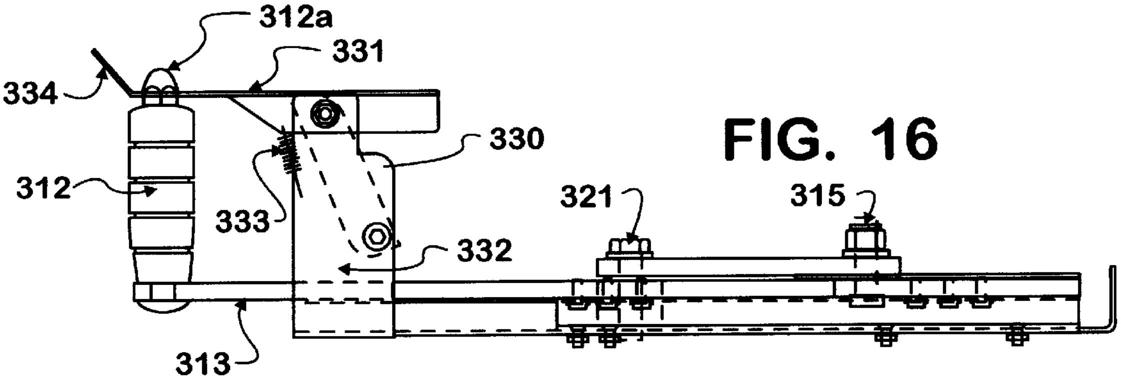

FIG. 16 is a side view of the improved school bus door shown in FIG. 12.

Figure 17:
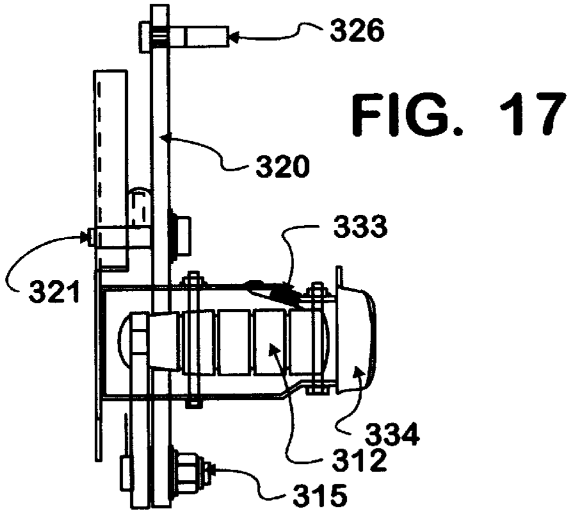

FIG. 17 is an end on view of the improved school bus doorshown in FIG. 12.

Figure 18:
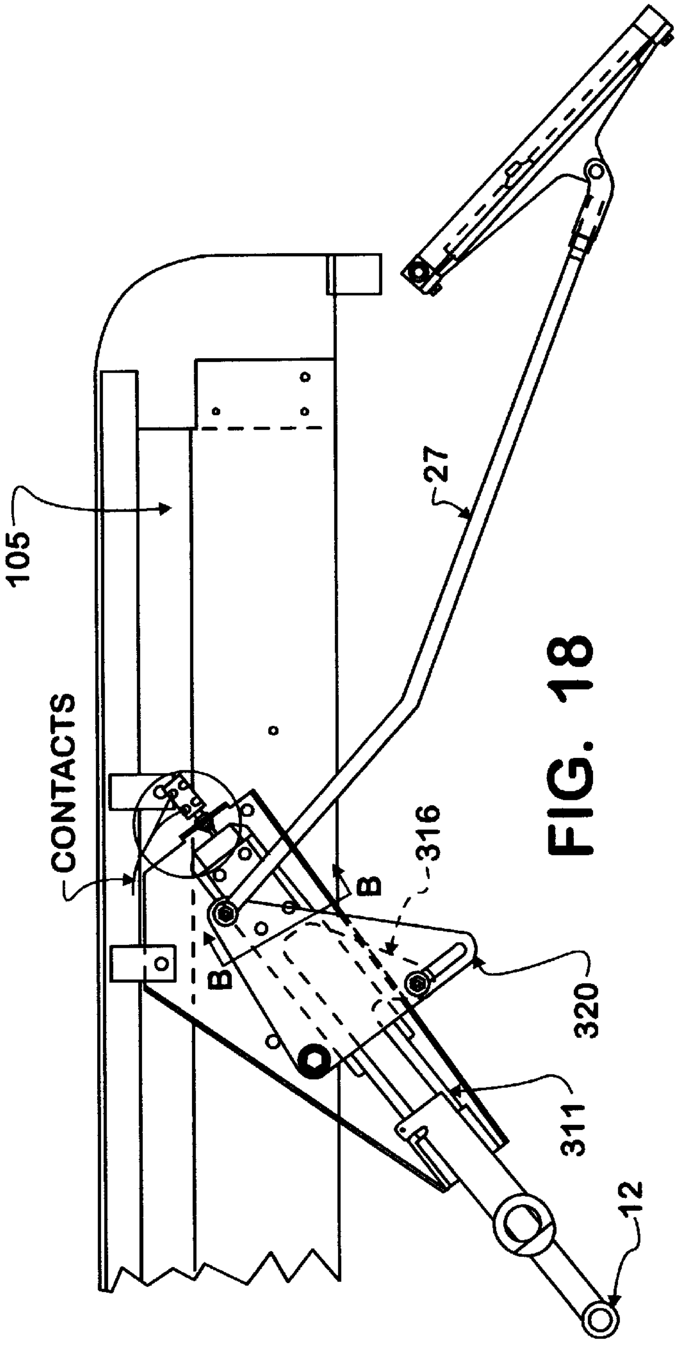

FIG. 18 is a top down view of the improved school bus door shown in FIG. 12 with a handle slide position warning light actuation switch installed.

Figure 19:
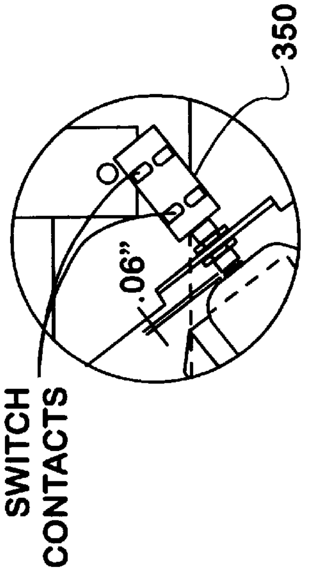

FIG. 19 is a blown up view of the ballooned portion of FIG. 18.

Figure 20:
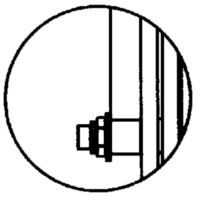

FIG. 20 is view B—B from FIG. 18.

Figure 21:
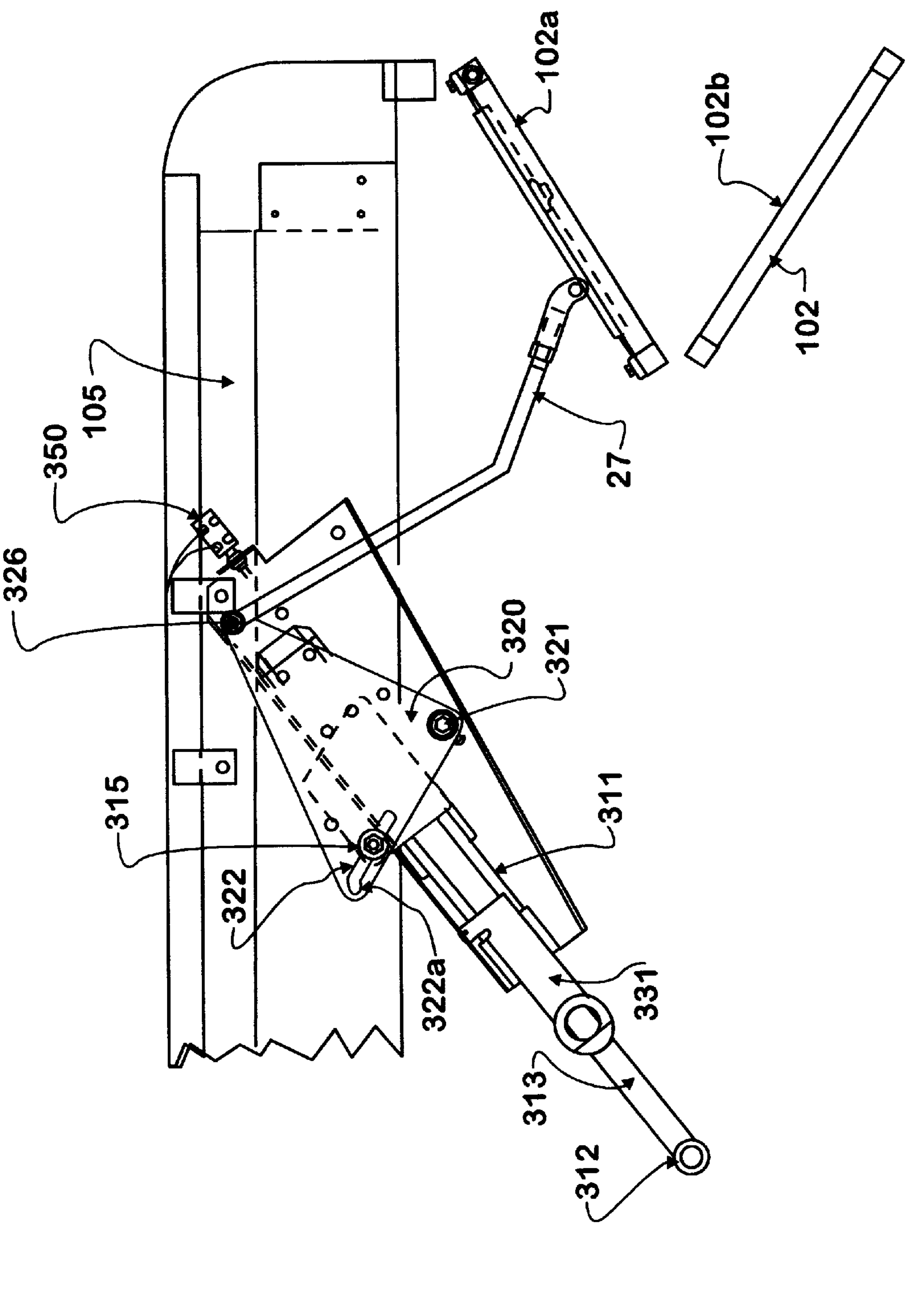

FIG. 21 is a top down view of an improved school bus door operator made in accordance with this invention installed on a folding school bus door and shown with the door partially open.

Figure 22:
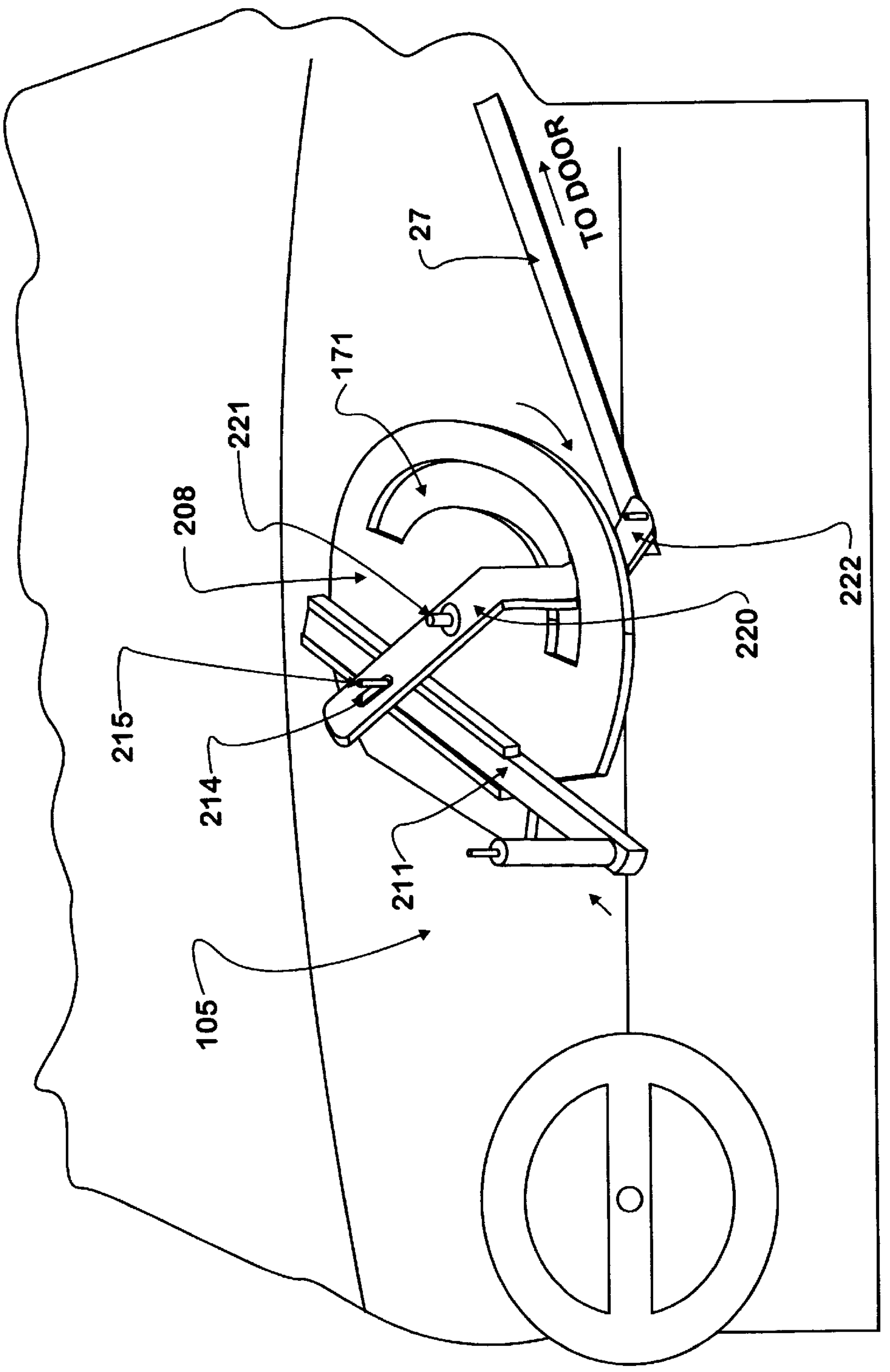

FIG. 22 is a partial cut away of a driver area of a school bus vehicle with another embodiment of an improved school bus door operator made in accordance with this invention shown with the door linkage arm in a retracted towards driver position.

Figure 23:
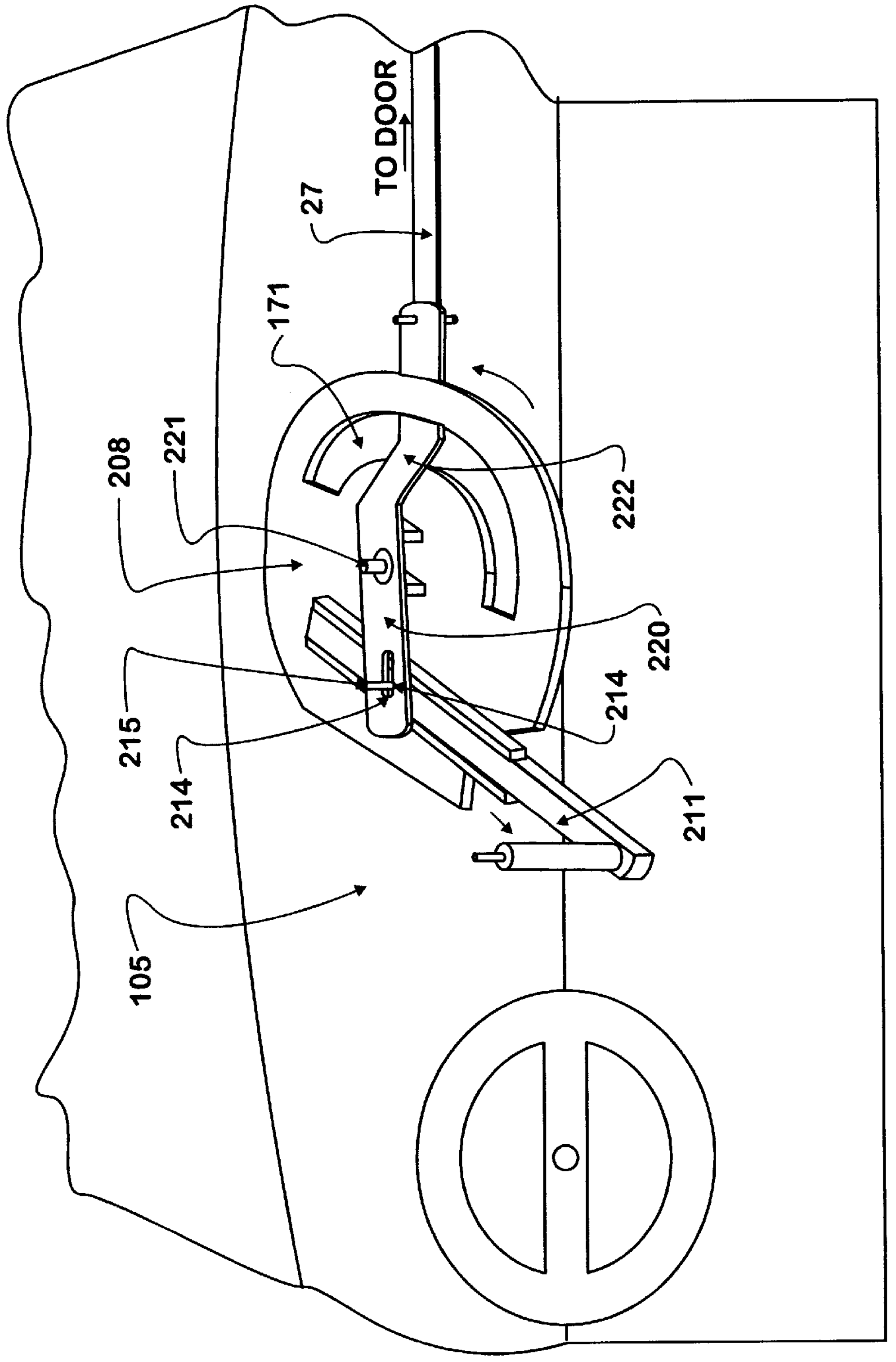

FIG. 23 is a partial cut away of a the improved door opener of FIG. 22 with the door linkage arm in an extended from the driver position.

DETAILS OF INVENTION

FIGS. 1 to 11 show a school bus vehicle 101 with an improved school bus door operator 10 made in accordance with this invention. This invention would work as well in non-school bus vehicle applications such as in tour buses or airport transport buses. A driver area 107 of the school bus 101 is shown in FIGS. 1, 2, 10 and 11. The school bus 101 shown is a left hand drive school bus although the invention may be made for a right hand drive bus. The driver sits on the left hand side and operates a steering wheel 103 engaged to a steering wheel column 104. A school bus door 102 consisting of a forward section 102*a* and a rearward section 102*b* is engaged to the vehicle 101 on the right side of the vehicle 101. The forward section 102*a* and the rearward section 102*b* are in a line when the door 102 is closed and are folded at an angle when the door 102 is open. A door-to-door engagement arm 109 is engaged between the forward section 102*a* and rearward section 102*b* of the school bus door 102. When the school bus door 102 is open, passengers enter the vehicle 101 via steps 106. A door linkage arm 27 is engaged to an outer frontward section of the forward section 102*a* of the school bus door 102 through a linkage-to-engagement hinge 28. The opposite side of the door linkage arm 27 of that engaged to the forward section 102*a* of the school bus door 102 is engaged to the improved school bus door operator 10. Operator movements of the door linkage arm 27 causes the forward section 102*a* to move which, in turn, causes the rearward section 102*b* to move through the door-to-door engagement arm 109. The improved school bus operator 10 is engaged to a dash or dashboard 105 of the vehicle 101. The invention will work as well for folding doors where the forward section 102*a* is directly hinged to the rearward section 102*b* with no door-to-door engagement arm 109 as shown in FIG. 21.

Figure 5:
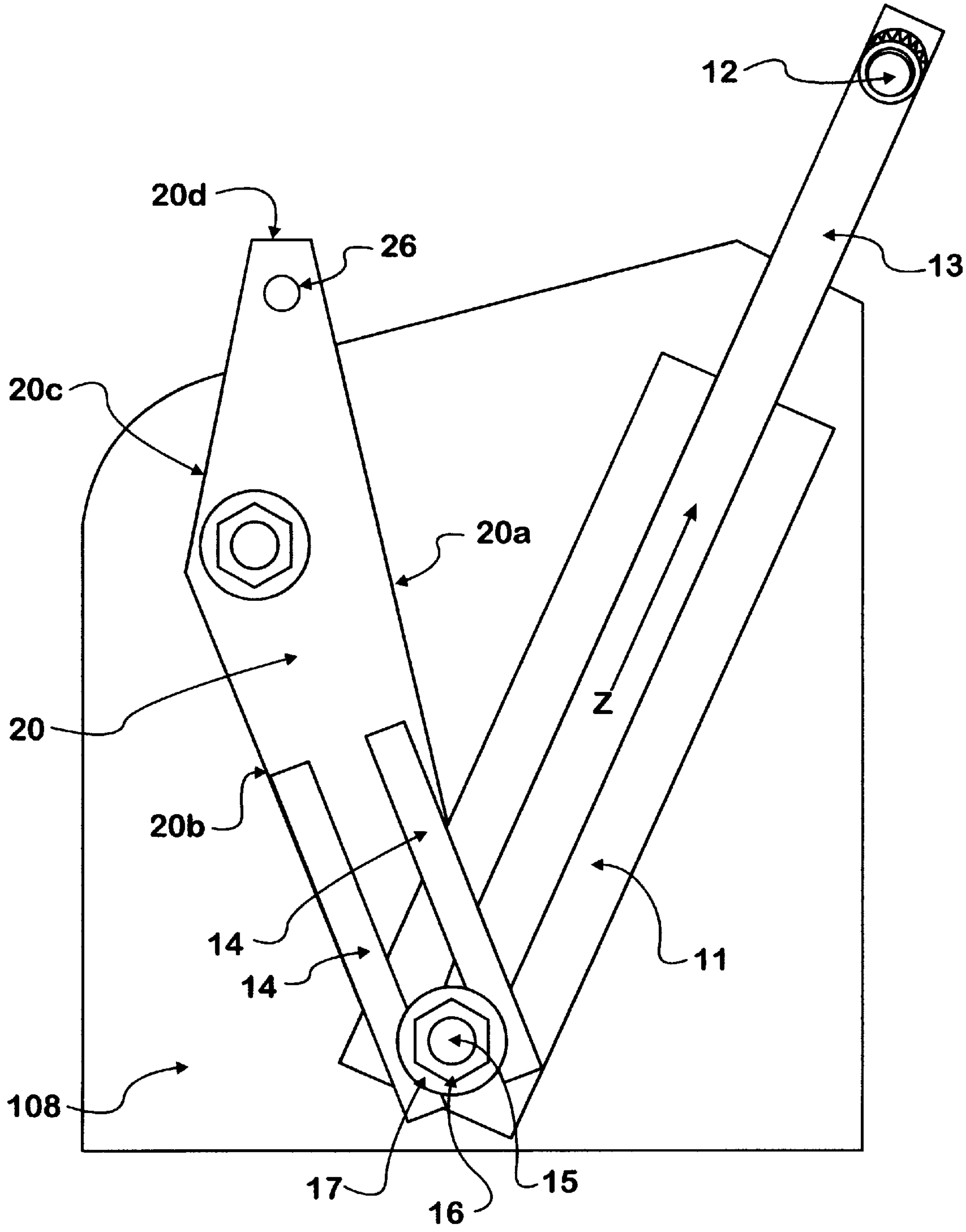
FIG. 5 is a top down view of the improved school bus operator of FIG. 3.
Figure 6:
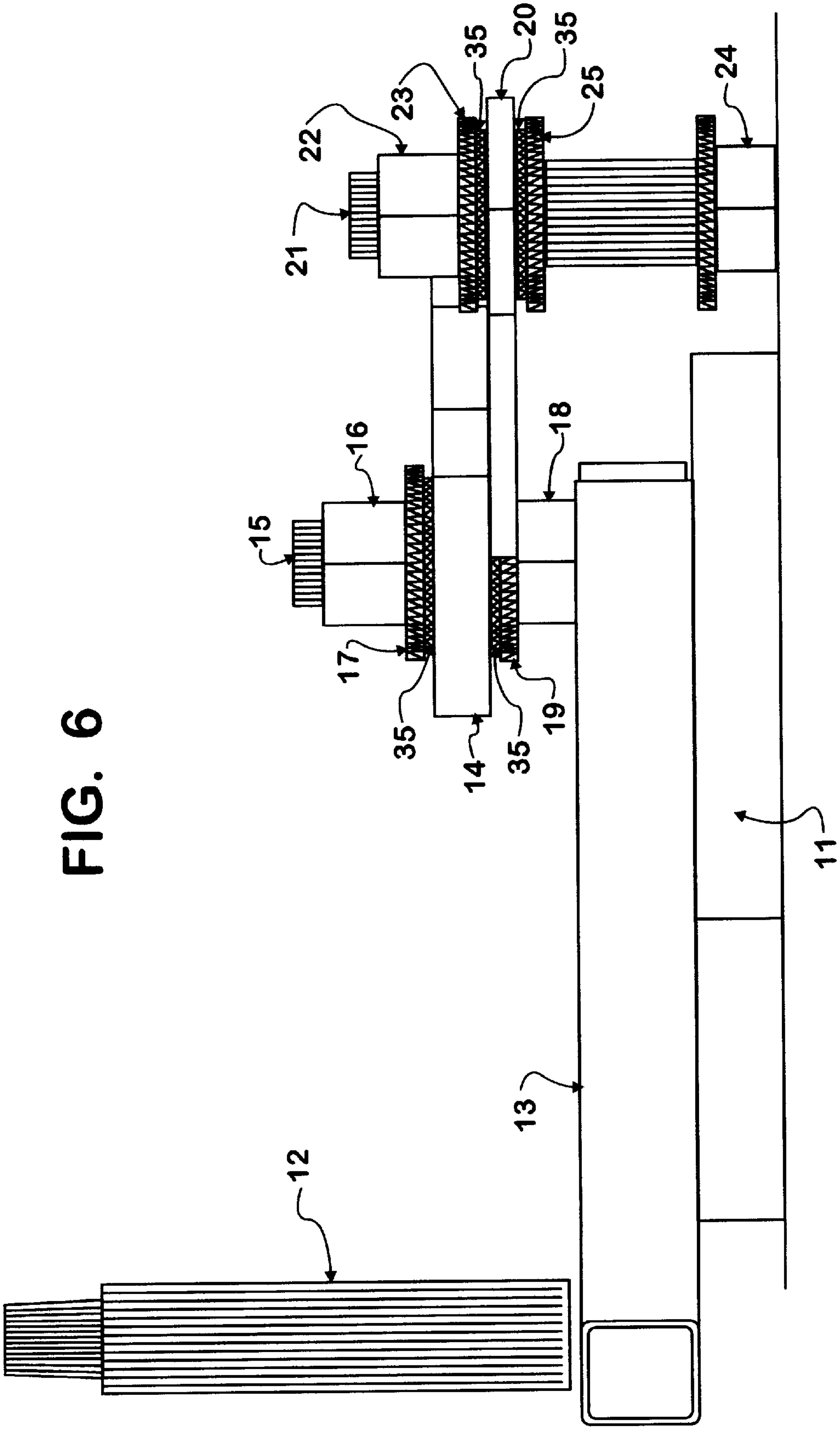
FIG. 6 is a back looking front side view of the improved school bus door operator of FIG. 3.
Figure 7:
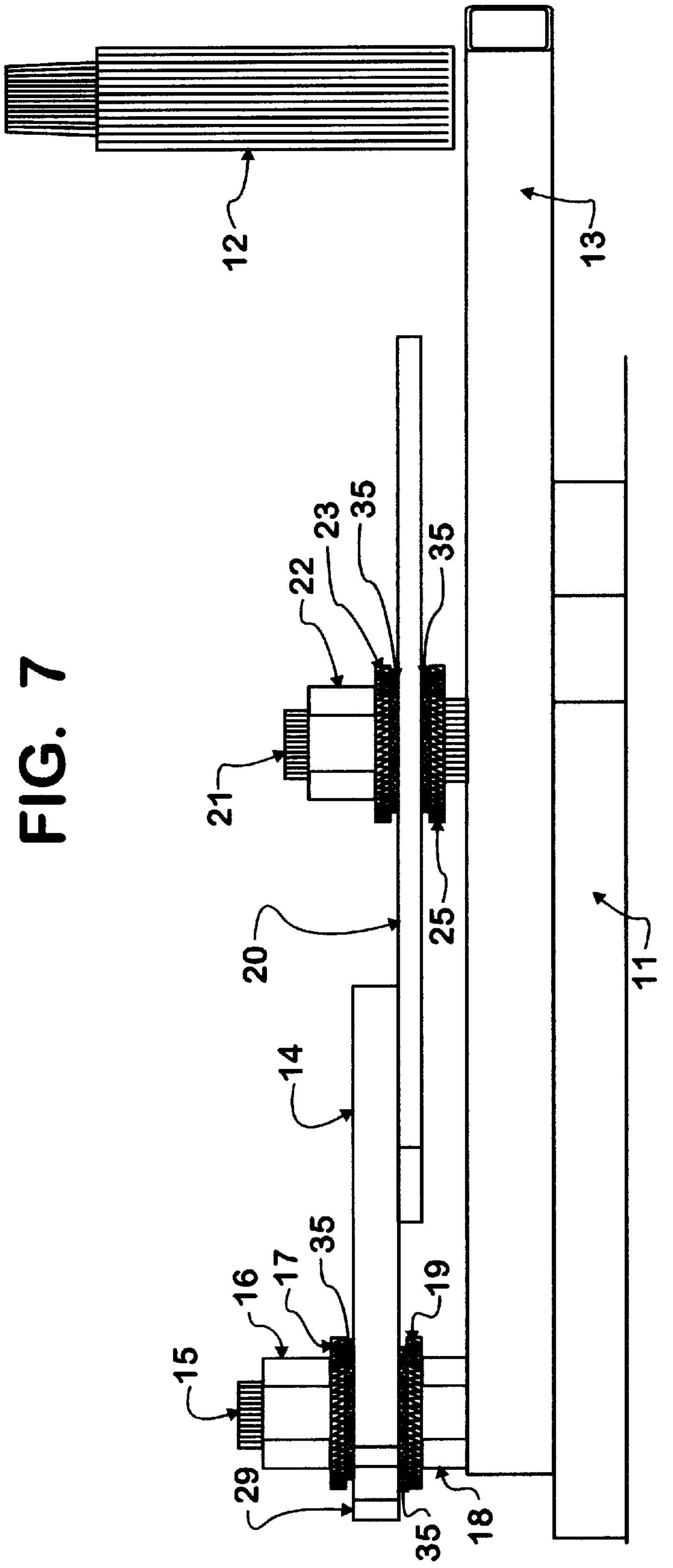
FIG. 7 is a front looking back side view of the improved school bus door operator of FIG. 3.
Figure 8:
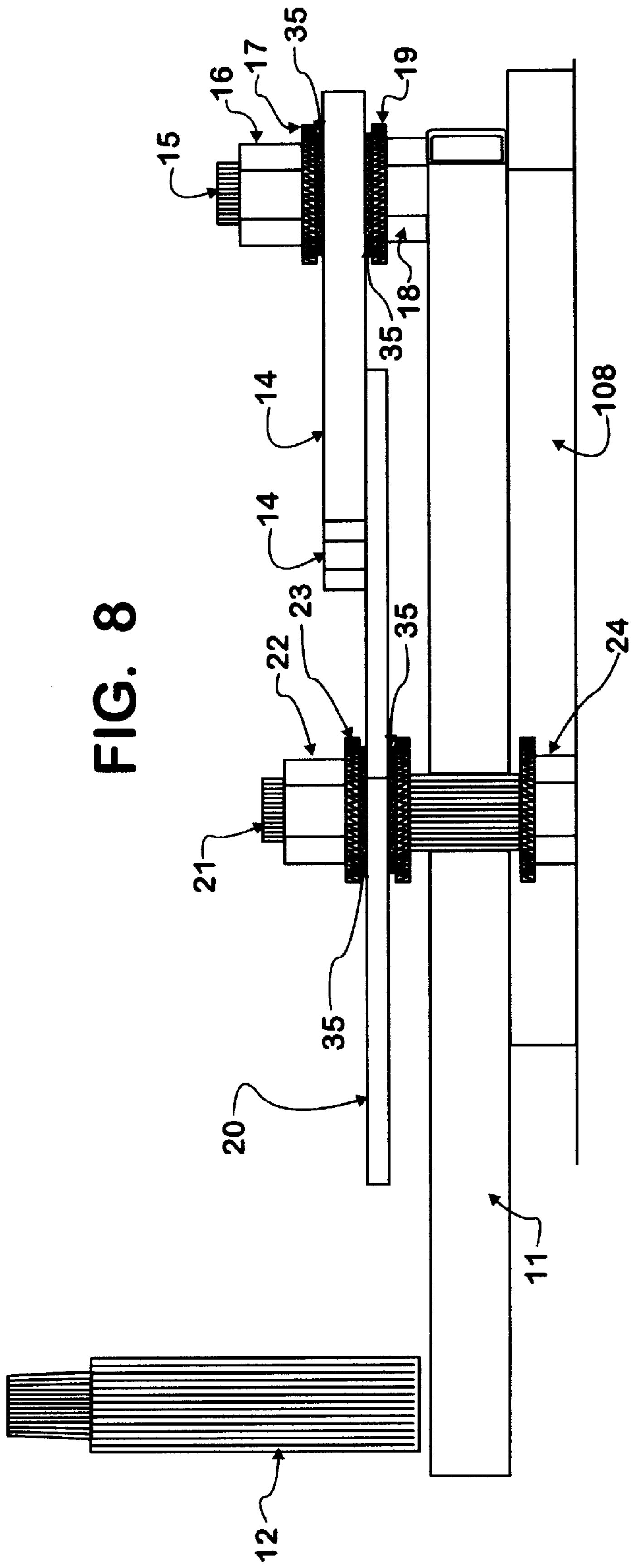
FIG. 8 is a school bus door side view of the improved school bus door operator of FIG. 3.

The improved school bus door operator 10 generally is comprised of a handle slide mechanism 11, a rotatable pivot arm 20 with the rotatable pivot arm 20 engaged to the door linkage arm 27 for operating the school bus door 102. The handle slide mechanism 11 has a slide arm 13 which may be moved in a linear fashion back or forth along the length of the handle slide mechanism 11. FIGS. 3 and 5 show direct of withdrawal direction arrow Z to illustrate the relative movement of the slide arm 13 to the handle slide mechanism 11. A rearward top surface of the slide arm 13 has a handle 12, the handle 12 may be cylindrical in shape and may be vertical or tilted at an angle for ease of grasping by the driver. The forward portion of the slide arm 13 opposite the end with the handle 12 has an engagement bolt or pawl 15 also in an upward facing vertical position. The lower portion of the engagement bolt 15 is engaged to a forward portion of the slide arm 13. In one embodiment, the engagement bolt or pawl is engaged to an upper face of the forward portion of the slide arm 13, although the engagement bolt or pawl 15 may also be engaged to a lower face of the slide arm 13. The handle slide mechanism 11 may be mounted either directly to the dash 105 or to a dash mount 108 which in turn would be then mounted to the dash 105 or other part of the school bus vehicle 101. The rotatable pivot arm 20 is engaged to a pivot bolt 21 which in turn is engaged to either the dash 105, or should it be used, to the dash mount 108, or other part of the driver area 107. These mounting arrangements and the short-stroke of the slide arm 13 will prevent the improved school bus door operator 10 from interfering with the vehicle 101 driving controls. The rotatable pivot arm 20 may be rotated about the pivot bolt 21. The rotatable pivot arm 20 has two generally rectangular shaped guide rails 14. The guide rails are one example of an engagement pawl directive means. Another example will be described later in the preferred embodiment. The guide rails 14 are parallel and spaced to accommodate the exterior diameter of the engagement bolt 15 of the slide arm 13. As the handle 12 is grasped and moved in a linear fashion either back or forth directing the slide arm 13 along the handle slide mechanism 11, the engagement bolt 15 moves between the guide rails 14 of the rotatable pivot arm 20. Assuming the handle 12 is at its forward most position to start and thereby directing the slide arm 13 to its forward most position relative to the handle slide mechanism 11, the engagement bolt 15 should be at a farthest most end of the guide rails 14. The guide rails 14 may each have an over travel stop 29, which juts inward to prevent the engagement bolt 15 from becoming disengaged should the handle 12 be moved more forward than its normal forward position. There is no relative vertical movement of the guide rails 14 relative to the engagement bolt 15. The guide rails are sandwiched between two rotatable washers 35 on the engagement bolt 15 and then further sandwiched by an upper engagement washer 17 on one side and a lower engagement washer 19 on the lower side, and a lower spacer 18 below the lower engagement washer 19 to prevent relative vertical movement of the rails 14. The rotatable washers may be of any low resistance material but in one embodiment are made of a Teflon impregnated fabric. The lower spacer 18, the lower engagement washer 19, the rotatable washers 35 are all engaged to the engagement bolt 15. An upper engagement nut 16 fastens the upper engagement washer 17 and all lower components in a fixed vertical position. The upper engagement nut 16 may be a nylon type locknut in one embodiment. As the handle 12 is moved in a linear fashion backward from its most forward position, the slide arm 13 moves generally rearward also. It should be noted that the handle slide mechanism 11 and hence the slide arm 13 in the embodiment shown in FIGS. 1 to 9 will be mounted at a slight angle off of the front to rear axis of the vehicle 101. This slight angle of the forward to back plane of the handle slide mechanism 11 is considered the most ergonomically efficient. With the slide arm 13 at its most forward position, the guide rails 14 and rotatable pivot arm 20 combination moment arm is at a maximum. As the slide arm 13 is slid rearward linearly along the handle slide mechanism 11, the moment arm of the guide rails 14 and rotatable pivot arm 20 combination decreases. The engagement bolt 15 moving along the guide rails 14 to a closer position to the pivot bolt 21 of the rotatable pivot arm 20 reduces the moment arm. At an intermediate position of the school bus door 102, the moment arm of the guide rails 14 and rotatable pivot arm 20 combination reaches a minimum. This also corresponds to a minimum need as far as torque to move the school bus door 102 through the door linkage arm 27. As the rotatable pivot arm 20 rotates about the pivot bolt 21, the door linkage arm 27, engaged to the rotatable pivot arm 20 at the door linkage engagement hole 26, moves to open the school bus door 102. This is due to the counter clockwise rotation of the rotatable pivot arm 20. As the slide arm 13 passes the intermediate position, the guide rails 14 and rotatable pivot arm 20 combination moment arm increases due to the relative movement of the engagement bolt 15 away from the pivot bolt 21 of the rotatable pivot arm 20. Following this increase in moment arm, the school bus door 102 reaches the fully open position. The moment arm of the guide rails 14 and rotatable pivot arm 20 again reaches a maximum as the school bus door 102 reaches the fully open position. The school bus door 102 is closed in an opposite fashion by moving the handle 12 and hence the slide arm 13 back to the most forward position.

The rotatable pivot arm 20 is engaged to the pivot bolt 21 as follows. A lower pivot nut 24 is at a lower end of the pivot bolt 21 and is flush against either the dash 105 or, if used, the dash mount 108. A lower pivot washer 25 also encompassing the pivot bolt 21 is located above the lower pivot nut. The rotatable pivot arm 20 is sandwiched between two rotatable washers 35 and on a lower side additionally a lower pivot washer 25 and an intermediate pivot nut. On the upper side of the rotatable pivot arm 20 also engaged to the pivot bolt 21 is a rotatable washer 35 as mentioned previously, an upper pivot washer 23 and an upper pivot nut 22 locking the lower components in preset vertical position. The pivot bolt 21 passes through these rotational components to allow rotation of the rotatable pivot arm 20 with the pivot bolt 21 being engaged to either the dash 105 or, if used, the dash mount 108. In the embodiment shown in FIGS. 1 to 9, the rotatable pivot arm 20 is a five-sided flat plate, the sides being a long side 20*a*, two intermediate sides 20*b* and 20*c*, and two short ends 20*d*. The pivot bolt 21 is joined to the rotatable pivot arm 20 adjacent to where the intermediate sides 20*b* and 20*c* intersect. The guide rails 14 of the rotatable pivot arm 20 stick out from the forward most short end 20*d* of the rotatable pivot arm 20. The rear most short end 20*d* is where the door linkage engagement hole 26 is engaged adjacent to an intermediate side 20*b* and the long side 20*a* of the rotatable pivot arm 20. In the embodiment shown in FIGS. 1 to 9, when the school bus door 102 is closed, the long side 20*a* of the rotatable pivot arm 20 is at a slight angle off of the front to rear axis of the vehicle 101 nearly opposite the angle of the handle slide mechanism 11 relative to the front to rear axis. The handle slide mechanism 11 may be a telescopic device in which the slide arm 13 fits within the slide mechanism 11. When the handle 12 is retracted rearward to open the school bus door 102, the slide arm 13 will be retracted from the slide mechanism 11. The handle 12 may have a handle lock operator 31 rotatably engaged to the handle 12 through locking pins 33. The handle lock operator 31 will be engaged to a locking line 32 which will also be engaged to a close-to-lock actuator 30 mounted on the slide arm 13 on the engagement bolt 15 end. When the handle lock operator 31 is squeezed by the driver, the locking line 32 will pull the close-to-lock actuator 30 and retract the actuator 30 from its locking position. The locking position of the close-to-lock actuator 30 fits flush against both front ends of the handle slide mechanism 11 and the slide arm 13, preventing the slide arm 13 from being moved linearly rearward. When unlocked the close-to-lock actuator 30 will move with the slide arm 13.

The preferred embodiment of the improved school bus operator 310 of this invention is shown in FIGS. 12 to 21. Like the earlier shown embodiment, there is generally a handle slide mechanism 311, a rotatable pivot arm 320 with the rotatable pivot arm 320 engaged to the door linkage arm 27 for operating the school bus door 102. This embodiment functions similar to the earlier described embodiment. The handle slide mechanism 311 has a slide arm 313 with a handle 312. The handle 312 may contain a locking pawl 312*a* that may lock the slide arm 313 in an inserted position. A slide arm locking mechanism 330 may be mounted to a dash mount 308 or to the slide mechanism 311 itself. The slide arm locking mechanism 330 will have a body 332 through which the slide arm 313 may move through and a spring loaded locking arm 331. As shown the spring loaded locking arm 331 is rotatably engaged to the body 332. Additionally, there is a spring 333 engaged between the spring loaded locking arm 331 and the body 332 to bias the locking arm 331 downwards. When the slide arm 313 is inserted along the handle slide mechanism 311, the upturned lip 334 of the locking arm 331 allows the locking pawl 312*a* of the handle 312 to slide under and into engagement with the locking arm 331. The spring 333 biases the locking arm 331 to engaged the locking pawl 312*a*. Once the slide arm 313 is locked in an inserted position, the door 102 is locked in the closed position. The driver may release slide arm 313 by grasping the handle 312 and using her thumb or a finger to raise the upturned lip 334 while pulling the handle 312 outwards and hence directing the slide arm 313 along the slide mechanism 313. Although only shown on this embodiment, this locking mechanism may be used on envisioned embodiments.

There is an engagement bolt or pawl 315 engaged to a wing 316 of the slide arm 313. The wing 316 allows the engagement bolt or pawl 315 to be slightly off center relative to the line of back and forth movement of the slide arm 313. The engagement bolt 315 is located at a mid-position along the slide arm 313 in comparison to the engagement bolt 15 of the slide arm 13 of the earlier embodiment which is located on an end opposite the handle 12. There may be a wear pad made of nylon between the interface of the slide arm 313 and the rotatable pivot arm 320. The preferred embodiment rotatable pivot arm 320 is generally triangularly shaped. One comer is rotatably fixed to the dash mount 308 or the dash 105 via a pivot bolt or pin 321. The door linkage arm 27 is rotatably engaged through a door linkage pin 326 to an adjacent comer of the rotatable pivot arm 320 from the pivot bolt or pin 321. The third comer of the rotable pivot arm contains a through-slot 322 through which the engagement bolt or pawl 315 of the slide arm 313 rides. The through-slot 322 performs the same function as the guide rails 14 of the earlier described embodiment and is another example of an engagement pawl directive means. As the driver of the vehicle disengages and moves the handle 312 of the slide arm 313 linearly along the handle slide mechanism 311 away from the slide arm locking mechanism 330, the engagement bolt or pawl 315 will move in the same line as the slide arm 313. The engagement bolt or pawl 315 will move within the through-slot 322 causing the rotatable pivot arm 320 to pivot about the pivot pin 321. This rotation of the pivot arm 320 causes the door linkage pin 326 and hence the end of the door linkage arm 27 to move along an semicircular arc. The door 102 opens. This same design is shown for a forward folding door 102 in FIG. 21. One difference is that the through-slot 322 and the pivot pin 21 relative positions are reversed. Additionally, the forward folding door version of FIG. 21 has a curved locking slot 322*a* in an end of the through-slot. The pawl 315 will engage into the locking slot 322*a* to allow the door to be locked in an open position. This will allow passengers to load the vehicle without the driver needing to hold the door 102 open.

A position switch or warning light activation switch 350 for the slide arm 313 and hence the door 102, may be engaged such that the switch 350 is engaged when the slide arm 313 is fully inserted or removed. The switch shown in FIG. 18 to 20 indicates when the slide arm 313 is fully inserted and the door 102 is closed although the switch could be positioned to indicate the opposite positions.

In another embodiment of an improved school bus door operator 10, as shown in FIGS. 22 and 23, there is a dash mount 208, which may be mounted to a dash 105 or other part of the vehicle 101. The dash mount 208 has a semicircular arc slot 171 cut in its face. A rotatable pivot arm 220 is rotatably engaged to the dash mount 208 at a radial center of the semicircular arc slot 171. The rotatable pivot arm 220 is engaged to the dash mount 208 through a pivot bolt 221 in a similar fashion as the rotatable pivot arm 20 is engaged to the dash mount 108 in the earlier described embodiment. The rotatable pivot arm 220 has guide rails 214 or equivalent engagement bolt directive means for an engagement bolt 215 on a handle slide mechanism 211 to ride in. The end of the rotatable pivot arm 220 opposite the end of pivot arm 220 with the guide rails 214 has a double bend zigzag arm 222 which rides in the semicircular arc slot 171 in the face of the dash mount 208. The opposite internal ends of the semicircular arc slot 171 act as over-travel limits for the rotatable pivot arm 220 and the handle slide mechanism 11 back and forth maximum locations. The handle slide mechanism 11 may also contain a locking device that locks a handle 212 in the door-closed position.

The improved school bus door operator 10 may be motorized in one embodiment. FIGS. 10 and 11 show a covered version of the improved school bus door operator. There is a cover 33 mounted on the dash 105. Within the cover there may be a linear screw type electric motor that has a screw shaft which drives in either a frontward and backward direction relative to the handle slide mechanism 11. The screw shaft will be engaged to the slide arm 13 so that the motor will be able to drive the school bus door 102 open or close by linear movement of the slide arm 13.

In another embodiment, an air-operated piston will be engaged to the slide arm 13. The piston may be double-acting and that will cause the school bus door 102 to fail in one position, preferably the last door position. In another embodiment the piston will be single acting with a spring to bias the piston in one direction. Air will be used to hold the school bus door closed in the preferred piston embodiment. More directly, air will be used through the piston to maintain the slide arm 13 in the closed position with the spring biasing piston and hence the slide arm 13 to the open position. In alternative embodiments, the piston may be hydraulically or electrically operated. The electrically operated could be a solenoid valve.

As described above, the improved school bus door operators of the present invention, and the vehicle 101 with the improved school bus door operators installed provide a number of advantages, some of which have been described above and others of which are inherent in the invention. Also modifications may be proposed to the improved school bus door operators 10 and 310 and the vehicle 101 with the improved school bus door operators installed without departing from the teachings herein.

We claim:

1. An improved vehicle door operator for use on a vehicle with a driver area on one side and a dash in a forward area of the vehicle, a door with at least two sections, the door being on a side of the vehicle opposite the driver area, the door sections in a line when the door is closed and folded when the door is open, and operation of one door section causing the other section to reposition, comprising:

a handle slide mechanism engaged to a structural component of the vehicle;

said slide mechanism having a slide arm which may be moved in linear fashion back and forth along the length of the slide mechanism;

said slide arm having a handle engaged to a rearward surface and said handle within reach of a vehicle driver seated in the driver area;

a forward portion of said slide arm has an engagement pawl;

a rotatable pivot arm rotatably engaged to a structural component of the vehicle;

said rotatable pivot arm having engagement pawl directive means between which said engagement pawl rides when said slide arm is moved back and forth along the length of the slide mechanism;

a door linkage arm engaged at one end to one of the door sections;

said door linkage arm rotatably engaged at another end to said rotatable pivot arm;

said door linkage arm aligned such that when said slide arm is moved linearly backwards on said slide mechanism, causing said engagement pawl to move between said engagement pawl directive means, causing said rotatable pivot arm to rotate, causing said end of said door linkage arm engaged to said rotatable pivot arm to move along an arc, and causing the door section engaged to said door linkage arm to open; and said door linkage arm aligned such that when said slide arm is moved linearly inwards on said slide mechanism, causing said engagement pawl to move between said engagement pawl directive means, causing said rotatable pivot arm to rotate, causing said end of said door linkage arm engaged to said rotatable pivot arm to move along an arc, and causing the door section engaged to said door linkage arm to close.

2. The improved vehicle door operator of claim 1, wherein:

said engagement pawl directive means are guide rails.

3. The improved vehicle door operator of claim 2, wherein:

said handle slide mechanism is mounted at a slight angle off of a front to rear axis of the vehicle.

4. The improved vehicle door operator of claim 2, wherein:

said slide arm moves on said handle slide mechanism telescopically.

5. The improved vehicle door operator of claim 3, wherein:

the structural component to which said handle slide mechanism is mounted is the dash.

6. The improved vehicle door operator of claim 3, further comprising:

a dash mount which is mounted to a structural component of the vehicle.

7. The improved vehicle door operator of claim 6, wherein:

the structural component to which said dash mount is mounted is the dash.

8. The improved vehicle door operator of claim 4, wherein:

said handle is cylindrical in shape.

9. The improved vehicle door operator of claim 2, wherein:

said rotatable pivot arm is rotatably engaged to the structural component of the vehicle through a pivot bolt.

10. The improved vehicle door operator of claim 2, wherein;

said guide rails are rectangular in shape and parallel with each other.

11. The improved vehicle door operator of claim 10, wherein:

said guide rails have an overtravel stop that juts inward between said guide rails to prevent said engagement pawl from becoming disengaged from said guide rails.

12. The improved vehicle door operator of claim 11, wherein:

said guide rails are sandwiched between two rotatable washers on said engagement pawl and further sandwiched by an upper engagement washer on one side and a lower engagement washer on a lower side;

a lower spacer below said lower engagement washer to prevent relative vertical movement of said guide rails; and said lower spacer, said lower engagement washer, said rotatable washers are all engaged to said engagement pawl.

13. The improved vehicle door operator of claim 12, wherein:

said rotatable washers are made of a low resistance material.

14. The improved vehicle door operator of claim 13, wherein:

said low resistance material is a teflon impregnated fabric.

15. The improved vehicle door operator of claim 2, wherein:

a moment arm of said engagement pawl directive means and said rotatable pivot arm in combination is at a maximum when the door is near full open.

16. The improved vehicle door operator of claim 9, wherein:

said rotatable pivot arm is a five-sided flat plate comprised of a long side, two intermediate sides, and two short ends;

said pivot bolt is joined to said rotatable pivot arm adjacent to where said intermediate sides intersect; and said guide rails stick out from a forward most short end of said rotatable pivot arm;

said door linkage engagement hole 26 is engaged to a rear most short end adjacent to an intermediate side and said long side of said rotatable pivot arm.

17. The improved vehicle door operator of claim 2, wherein:

a handle lock operator rotatably engaged to said handle through locking pins;

said handle lock operator engaged to a locking line also engaged to a close-to-lock actuator mounted on said slide arm on an end opposite said handle;

said handle lock operator upon squeezing by a driver causing said locking line to pill said close-to-lock actuator and retract said actuator from a locking position;

said close-to-lock actuator is said locking position fitting flush against both front ends of said handle slide mechanism and said slide arm preventing said slide arm form being moved linearity rearward; and said close-to-lock actuator moving with said arm when unlocked.

18. The improved vehicle door operator of claim 1, wherein:

said engagement pawl directive means is a through-slot.

19. The improved vehicle door operator of claim 18, wherein:

said handle slide mechanism is mounted at a slight angle off of a front to rear axis of the vehicle.

20. The improved vehicle door operator of claim 18, wherein:

said slide arm moves on said handle slide mechanism telescopically.

21. The improved vehicle door operator of claim 19, wherein:

the structural component to which said handle slide mechanism is mounted is the dash.

22. The improved vehicle door operator of claim 19, further comprising:

a dash mount which is mounted to a structural component of the vehicle.

23. The improved vehicle door operator of claim 22, wherein:

the structural component to which said dash mount is mounted is the dash.

24. The improved vehicle door operator of claim 18, wherein:

said handle is cylindrical in shape and generally vertical in position.

25. The improved vehicle door operator of claim 18, wherein:

said rotatable pivot arm is generally triangularly shaped with one comer rotatably fixed to a structural component of the vehicle;

said door linkage arm rotatably engaged through a door linkage pin to an adjacent corner of said rotatable pivot arm; and said third comer of said rotable pivot arm containing said through-slot through which said engagement pawl of said slide arm rides.

26. The improved vehicle door operator of claim 25, wherein:

there is a slide arm locking mechanism.

27. The improved vehicle door operator of claim 26, wherein said slide arm locking mechanism is comprised of:

a handle locking pawl on said handle;

a body through which said slide arm may move through;

a spring loaded locking arm rotatably engaged to said body;

a spring 333 engaged between said spring loaded locking arm and said body to bias said locking arm 331 downwards to engage said handle locking pawl;

an upturned lip of said locking arm allowing said handle locking pawl to slide under and into engagement with the locking arm when said slide arm is inserted;

said spring biasing said locking arm to engage said handle locking pawl; and said upturned lip releasable by upwards pressure by a driver to release said slide arm and allow the door to open.

28. The improved vehicle door operator of claim 18, wherein:

said engagement pawl is located off center relative to a centerline of said slide arm.

29. The improved vehicle door operator of claim 28, wherein:

said engagement pawl is engaged to a wing of said slide arm.

30. An improved vehicle door operator in combination a vehicle, a door with at least two sections, the door being on a side of the vehicle opposite the driver area, the door sections in a line when the door is closed and folded when the door is open, and operation of one door section causing the other section to reposition, comprising:

a driver area on one side of the vehicle;

a dash in a forward area of the vehicle;

said door being on a side of the vehicle opposite said driver area;

said door sections in a line when said door is closed and folded when said door is open;

operation of one door section causing said other section to reposition;

a handle slide mechanism engaged to a structural component of the vehicle;

said slide mechanism having a slide arm which may be moved in linear fashion back and forth along the length of the slide mechanism;

said slide arm having a handle engaged to a rearward surface and said handle within reach of a vehicle driver seated in said driver area;

a forward portion of said slide arm has an engagement pawl;

a rotatable pivot am rotatably engaged to a structural component of the vehicle;

said rotatable pivot arm having engagement pawl directive means between which said engagement pawl rides when said slide arm is moved back and forth along the length of the slide mechanism;

a door linkage arm engaged at one end to one of said door sections;

said door linkage arm rotatably engaged at another end to said rotatable pivot arm;

said door linkage arm aligned such that when said slide arm is moved linearly backwards on said slide mechanism, causing said engagement pawl to move between said engagement pawl directive means, causing said rotatable pivot arm to rotate, causing said end of said door linkage arm engaged to said rotatable pivot arm to move along an arc, and causing said door section engaged to said door linkage arm to open; and said door linkage arm aligned such that when said slide arm is moved linearly inwards on said slide mechanism, causing said engagement pawl to move between said engagement pawl directive means, causing said rotatable pivot arm to rotate, causing said end of said door linkage arm engaged to said rotatable pivot arm to move along an arc, and causing said door section engaged to said door linkage arm to close.

31. An improved vehicle door operator for use on a vehicle with a driver area on one side and a dash in a forward area of the vehicle, a door with at least two sections, the door being on a side of the vehicle opposite the driver area, the door sections in a line when the door is closed and folded when the door is open, and operation of one door section causing the other section to reposition, wherein said improvement is that driver moves a handle in a linear back and forth motion that is translated to rotational motion to operate one door section.

32. An improved vehicle door operator for use on a vehicle with a driver area on one side and a dash in a forward area of the vehicle, a door with at least two sections, the door being on a side of the vehicle opposite the driver area, the door sections in a line when the door is closed and folded when the door is open, and operation of one door section causing the other section to reposition, comprising:

a slide mechanism engaged to a structural component of the vehicle;

said slide mechanism having a slide arm which may be moved in linear fashion back and forth along the length of the slide mechanism;

said slide arm engaged to a motor operable by a driver in the driver area;

said motor capable of driving said slide arm inwards and outwards along said slide mechanism;

a forward portion of said slide arm has an engagement pawl;

a rotatable pivot arm rotatably engaged to a structural component of the vehicle;

said rotatable pivot arm having engagement pawl directive means between which said engagement pawl rides when said slide arm is moved back and forth along the length of the slide mechanism;

a door linkage arm engaged at one end to one of the door sections;

said door linkage arm rotatably engaged at another end to said rotatable pivot arm;

said door linkage arm aligned such that when said slide arm is moved linearly backwards on said slide mechanism, causing said engagement pawl to move between said engagement pawl directive means, causing said rotatable pivot arm to rotate, causing said end of said door linkage arm engaged to said rotatable pivot arm to move along an arc, and causing the door section engaged to said door linkage arm to open; and said door engagement arm aligned such that when said slide arm is moved linearly inwards on said slide mechanism, causing said engagement pawl to move between said engagement pawl directive means, causing said rotatable pivot arm to rotate, causing said end of said door linkage arm engaged to said rotatable pivot arm to move along an arc, and causing the door section engaged to said door linkage arm to dose.

33. The improved vehicle door operator of claim 1, further comprising:

a dash mount;

a semicircular arc slot in a face of said dash mount;

said rotatable pivot arm rotatably engaged to said dash mount at a radial center of said semicircular arc slot;

said rotatable pivot arm engaged to said dash mount through a pivot bolt;

one end of said rotatable pivot arm opposite said end of said pivot arm with said engagement pawl directive means has a double bend zigzag arm;

said zigzag arm rides in said semicircular arc slot; and opposite internal ends of said semicircular arc slot act as over-travel limits for said rotatable pivot arm and said handle slide mechanism.

* * * * *